H. R. RICARDO & A. E. L. CHORLTON.
METHOD OF AND APPARATUS FOR CONTROLLING THE FLOW OF FLUIDS.
APPLICATION FILED JULY 1, 1914.

1,246,159.

Patented Nov. 13, 1917.
2 SHEETS—SHEET 1.

UNITED STATES PATENT OFFICE.

HARRY RALPH RICARDO, OF LONDON, AND ALAN ERNEST LEOFRIC CHORLTON, OF SWALLOWBECK, ENGLAND.

METHOD OF AND APPARATUS FOR CONTROLLING THE FLOW OF FLUIDS.

1,246,159.  Specification of Letters Patent.  Patented Nov. 13, 1917.

Application filed July 1, 1914. Serial No. 848,446.

*To all whom it may concern:*

Be it known that we, HARRY RALPH RICARDO, subject of the King of England, residing at London, in England, and ALAN ERNEST LEOFRIC CHORLTON, subject of the King of England, residing at Swallowbeck, Lincoln, in England, have invented a certain new and useful Improved Method of and Apparatus for Controlling the Flow of Fluids, of which the following is a specification.

This invention relates to a method of and apparatus for controlling the flow of fluids more especially through pipes and has for its object to take up, average, or damp oscillations or vibrations which occur under certain conditions and by preventing or reducing such oscillations obviate the disadvantages which arise therefrom.

It is known that when a fluid either a gas or liquid is intermittently drawn or forced through a pipe oscillations or vibrations tend to be set up in the fluid and the resultant variation in the flow at the end of the pipe has a disadvantageous effect for example where the fluid is employed in generating or transmitting power. Starting from one point in a pipe, such a vibration travels to another point, in what may be termed a positive direction, and returns in a negative direction, then swinging again in a positive direction and back until the vibration dies out. To effectively deal with such vibrations or oscillations it is necessary to absorb or damp the positive vibrations as they reach any point and also to give out energy beyond this point to compensate for a negative vibration and so maintain a mean speed. Attempts have been made to deal with this problem by leading the fluid into an annular conduit either with the velocity unaltered or reduced, the course of the fluid being so impeded by baffles or its direction changed that the fluid lost its energy and consequently practically no resistance was offered to a positive disturbing vibration nor was energy given out to compensate for a negative vibration.

According to this invention the fluid is led through a converging passage into an annular conduit wherein it is caused to circulate or rotate at increased speed and whence it passes without material loss of energy through a diverging outlet. The construction of the apparatus is such that while avoiding fluid friction as far as possible pressure which may vary in intensity is converted into velocity and velocity is again converted into pressure but of approximately constant intensity. Thus any fluctuations in pressure or oscillations or vibrations are entirely or to a considerable extent lost or damped out, whether they are positive or negative, that is to say, whether they exist at the incoming or outgoing side, by means of the circulating or rotary movement which has been imparted to the fluid in its passage through the apparatus. The essential portions of the apparatus indicated above may be said to resemble a Venturi tube of which the throat is constituted by the annular conduit. The action of the fluid in the annular conduit may further be likened to the action of a fly-wheel in that energy is stored in the rapidly rotating body of fluid.

The apparatus is capable of many applications and may be constructed in various ways. The converging inlet which may be disposed either within or without or axially with relation to the annular conduit, conducts the fluid to a series of vanes which deliver it tangentially with increased velocity into the conduit. The position of the diverging outlet may similarly vary with relation to the annular conduit but is so disposed that the fluid will pass tangentially from the latter and lose velocity as it flows to or through this outlet.

As an example of how the invention may be put into practice it may be described as applied to the induction pipe of an internal combustion engine where the apparatus serves to damp out or more or less eliminate the oscillations which tend to occur in the combustible mixture flowing through this pipe. The combustible mixture drawn from the carbureter is led into a chamber of circular cross-section whose walls converge to a narrow annular slot formed in the external periphery of this gas chamber. Within the chamber is arranged a series of curved vanes so formed and placed as to direct the gas passing through the annular slot in a tangential manner into an annular conduit which surrounds the gas chamber and into which opens the annual converging passage. The convergence of this passage causes the gas to flow with increased velocity into the annular conduit wherein it circulates or rotates at high speed, any fluctuations in the pressure of the gas being largely or altogether eliminated. In the external periphery of the annular conduit is formed an opening which communicates with a tangentially disposed passage leading to a diverging outlet. The latter communicates with the induction pipe through which the gas is conveyed to the cylinder or cylinders of the engine. The gas will issue from the annular conduit or be drawn into the induction pipe and passed to the engine with decreased velocity and at substantially constant pressure.

It is to be noted that the inertia of the fluid rotating or circulating in the annular chamber may be advantageously employed in some cases as for example where the invention is applied as above instanced to the induction pipe of an internal combustion engine where the inertia of the gas passing through the outlet will tend to assist the gas in entering the cylinder.

As another example of the application of the invention its employment in conjunction with the exhaust or eduction passage from the cylinder of an internal combustion engine may be instanced. Here the gas which issues intermittently from the cylinder is led into a gas chamber of convenient form which converges to an annular conduit into which the gas is led in some such manner as already described. The oscillations or pulsations which arise in the body of the gas will by this device be considerably damped down and not only will the gas pass to the exhaust with a more regular velocity but it will be more efficiently withdrawn from the cylinder thus aiding the scavenging and assisting or producing silencing.

In the accompanying drawings,

Fig. 6 is a transverse section through a device constructed in accordance with this invention for use in conjunction with the carbureter of an internal combustion engine.

Fig. 7 is a section on the line 7—7 of Fig. 6.

Like letters indicate like parts throughout the drawings.

Figure 1:
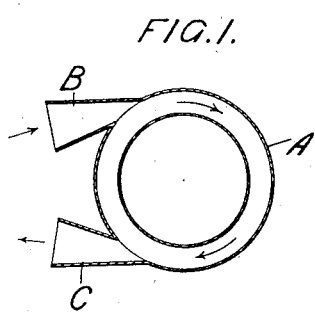
Figure 1 is a diagrammatic illustration of one of the simplest methods of carrying out the present invention.

The invention as diagrammatically illustrated in Fig. 1 comprises an annular conduit A having a tangential converging inlet B and a tangential diverging outlet C. The fluid passing through B enters the annular conduit A with increased velocity owing to the converging nature of the inlet and circulates or rotates in the conduit A. Thence it passes out through C with reduced velocity owing to the diverging construction of the outlet. Any fluctuations which may occur in the pressure of the fluid before it passes through the inlet B tend to be eliminated or damped out as the fluid circulates in the annular conduit A so that when the fluid issues from C it will pass out at substantially constant pressure.

Figure 2:
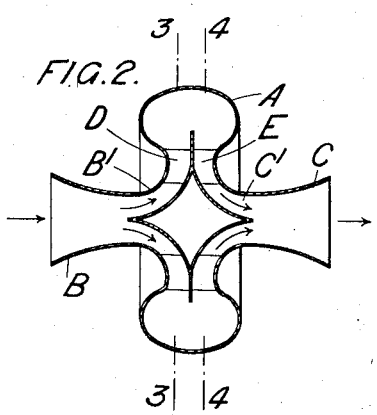
Fig. 2 is a diagrammatic sectional elevation of another method of carrying out the invention.
Figure 3:
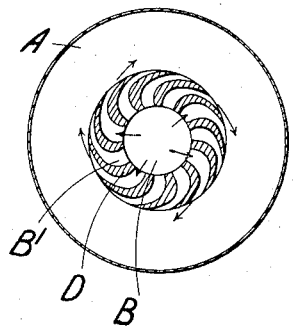
Fig. 3 is a transverse section on the line 3—3 of Fig. 2.
Figure 4:
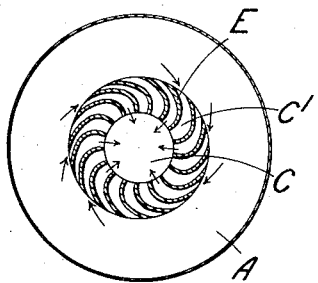
Fig. 4 is a transverse section on the line 4—4 of Fig. 2.

In the construction diagrammatically illustrated in Fig. 2 the inlet B is arranged co-axially with the annular conduit A. The inlet B converges and communicates with the conduit A through a narrow flared passage B' in which is disposed a series of vanes D. The passage B' leads into the annular conduit A through an annular opening on the inner periphery of the conduit A. The vanes D are arranged as shown in Fig. 3 so that the fluid passing from the inlet B through the passage B' is directed into the conduit A in a manner which will cause it to circulate or rotate therein in the desired manner. The fluid passes to the outlet C through a narrow fluid passage C' similar to the inlet passage B' but having in it vanes E so formed and arranged as to direct the outflowing fluid to the outlet C whence it issues with decreased velocity but practically at uniform pressure. The vanes in the outlet are shown in Fig. 4 and are arranged so as to prevent any material loss from eddying or friction.

Figure 5:
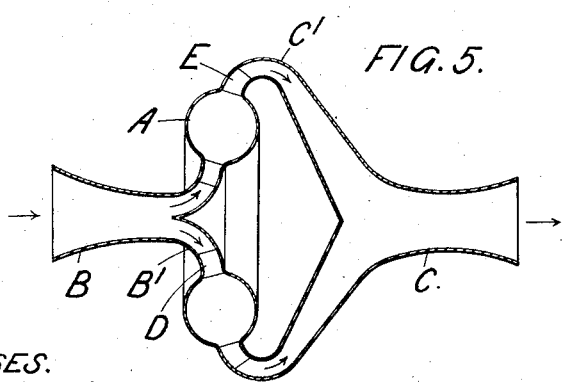
Fig. 5 is a diagrammatic sectional elevation of a further modification.

Fig. 5 illustrates a modification where the fluid is led radially outward into the inner side of the annular conduit A passing first through a converging inlet B and thence through a narrow flared passage B' past vanes D arranged as in the construction illustrated in Fig. 2. On leaving the conduit A the fluid in this case passes from the outer side or periphery of the conduit into a narrow passage C' having vanes E the passage C' being curved around and directed toward the axis of the device where this passage opens into the diverging outlet C.

The construction illustrated in Figs. 6 and 7 is in effect a combination of the arrangement illustrated in Figs. 1 and 2 the fluid being led into the annular conduit A from a central passage somewhat as shown in Fig. 2, but the outlet being tangential as shown in Fig. 1. The device is conveniently built up of two members one of which F is substantially of bell shape with a semi-circular annular recess G, which forms one half of the annular conduit A, disposed toward its outer periphery. Projections H formed on the inner face of the bell F constitute the vanes for directing the fluid from the inlet B into the annular conduit A. These projections, shown in Fig. 7, which is actually a section on the line 7—7 of Fig. 6, are curved and so shaped as to leave between them curved channels in passing through which the fluid will be so directed into the conduit as to circulate therein in the direction of the arrow in Fig. 6.

The second member of which the device is formed is constructed as a flat disk J with an annular semi-circular recess K disposed around its outer periphery, this recess constituting the other half of the annular conduit A. When the disk J is applied, as shown in Fig. 7, to the bell F so as to close the face thereof the disk J combines with the projections H to complete the curved passages between the latter. These passages converge to narrow slots where they open into the conduit A. The parts J and F are conveniently provided with peripheral flanges by means of which they can be connected together by screws or bolts.

The outlet C is arranged tangentially with respect to the conduit A as shown in Fig. 6, the wall of this outlet being formed as to one half out of the member F and as to the other half out of the member J.

The device illustrated in Figs. 6 and 7 is intended for use with an internal combustion engine the inlet B being connected to the carbureter and the outlet C leading by an induction pipe to the cylinders. The combustible mixture may enter at B with varying pressure but the gas passes through the converging passages with increased velocity into the annular conduit A wherein the gas rotates or circulates. Any fluctuations in pressure are here substantially damped out so that gas on being withdrawn through the outlet C to the cylinders will enter the latter at substantially constant pressure.

As already mentioned the present invention may be employed to control the flow of fluids of various kinds and further may be used to eliminate or reduce fluctuations in pressure or oscillations whether these originate from the manner in which the fluid is introduced into the pipe, that is to say, at the incoming end or whether they originate from the manner in which the fluid is withdrawn, that is to say at the outgoing end of the pipe. Thus the invention may be employed not only as more particularly described above with reference to internal combustion engines but with steam or other gases and also with water or other liquids wherever it is desirable to take up or damp out the oscillations or pulsations set up by a fluid intermittently delivered into, traversing or drawn through a pipe or orifice. Thus in the case of an internal combustion pump the present device may be employed with advantage in the delivery instead of the play pipe at present used.

What we claim as our invention and desire to secure by Letters Patent is:—

1. In an apparatus for controlling the flow of fluids through pipes the combination with an annular conduit having a converging inlet, whereby the fluid is led into the annular conduit with increased velocity, and an outlet through which the fluid can be led from the annular conduit, of a series of vanes in the inlet which so direct the fluid entering the annular conduit that it is caused to circulate or rotate therein with increased velocity and a fly-wheel action as set forth.

2. In an apparatus for controlling the flow of fluids through pipes the combination with an annular conduit having a converging inlet, adapted to lead the fluid into the annular conduit with increased velocity and cause it to circulate or rotate therein with a fly-wheel action, of a diverging outlet, and a series of vanes in the outlet to so direct the fluid from the annular conduit to the outlet as to prevent any material loss from eddying or friction, as set forth.

3. In an apparatus for controlling the flow of fluids through pipes the combination with an annular conduit having a converging inlet, whereby the fluid is led into the annular conduit with increased velocity, and a diverging outlet through which the fluid can be led from the annular conduit, of a series of vanes in the inlet which so direct the fluid entering the annular conduit that it is caused to circulate or rotate therein with a fly-wheel action, and a series of vanes in the outlet which so direct the fluid from the annular conduit to the outlet as to prevent any material loss from eddying or friction as set forth.

4. In an apparatus for controlling the flow of fluid through pipes, the combination of an annular conduit having an annular inlet, a converging passage communicating with said inlet, a series of vanes so disposed as to direct the fluid passing through said converging passage in a substantially tangential manner into the conduit, an outlet communicating with the conduit, and means whereby the fluid is led to the outlet in such a manner as to obviate material loss from eddying or friction, as set forth.

In testimony whereof we have signed our names to this specification in the presence of two subscribing witnesses.

HARRY RALPH RICARDO.

Witnesses:
 MAURICE STRODE,
 ARCHIBALD JOHN FRENCH.

ALAN ERNEST LEOFRIC CHORLTON.

Witnesses:
 HENRY HASPER,
 WOLDEMAR HAUPT.